(12) United States Patent
Motoe et al.

(10) Patent No.: US 7,565,674 B2
(45) Date of Patent: Jul. 21, 2009

(54) WIRELESS DATA-TRANSFERRING APPARATUS

(75) Inventors: Hironori Motoe, Ome (JP); Hiroyuki Oka, Kawasaki (JP); Shigenobu Sato, Iruma (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1136 days.

(21) Appl. No.: 10/348,817

(22) Filed: Jan. 22, 2003

(65) Prior Publication Data

US 2003/0145334 A1    Jul. 31, 2003

(30) Foreign Application Priority Data

Jan. 29, 2002    (JP) .............................. 2002-020560

(51) Int. Cl.
*H04N 7/18*    (2006.01)
*H04N 7/173*    (2006.01)

(52) U.S. Cl. ............................. 725/81; 725/82; 725/123
(58) Field of Classification Search ................... 725/81, 725/121, 123
See application file for complete search history.

(56) References Cited

U.S. PATENT DOCUMENTS

| | | | |
|---|---|---|---|
| 5,752,193 A * | 5/1998 | Scholefield et al. ...... | 455/452.2 |
| 5,929,849 A | 7/1999 | Kikinis | |
| 6,131,130 A | 10/2000 | Van Ryzin | |
| 6,263,503 B1 * | 7/2001 | Margulis ..................... | 725/81 |
| 6,466,587 B1 * | 10/2002 | Sugaya ........................ | 370/468 |
| 6,930,661 B2 * | 8/2005 | Uchida et al. .................. | 345/87 |
| 7,020,117 B2 * | 3/2006 | Nire ............................ | 370/338 |
| 7,039,116 B1 * | 5/2006 | Zhang et al. ............ | 375/240.26 |
| 2002/0059585 A1 | 5/2002 | Maeda | |
| 2002/0122137 A1 * | 9/2002 | Chen et al. .................. | 348/552 |
| 2004/0255326 A1 * | 12/2004 | Hicks et al. .................... | 725/81 |
| 2006/0288375 A1 * | 12/2006 | Ortiz et al. .................... | 725/62 |

FOREIGN PATENT DOCUMENTS

| | | |
|---|---|---|
| EP | 1 164 790 A2 | 12/2001 |
| JP | 03-155241 | 7/1991 |
| JP | 09-149332 | 6/1997 |

(Continued)

OTHER PUBLICATIONS

Japanese Patent Office, "Office Action," issued Apr. 12, 2005.

(Continued)

*Primary Examiner*—John W Miller
*Assistant Examiner*—Chris Parry
(74) *Attorney, Agent, or Firm*—Pillsbury Winthrop Shaw Pittman LLP

(57) ABSTRACT

A wireless data-transferring apparatus performs wireless communication with an information-processing terminal. The data-transferring apparatus includes a unit for receiving broadcast program data, a unit for compression-encoding the broadcast program data received by the receiving unit, and a communications control device. The communications control device is configured to perform data-transfer between an external network and the information-processing terminal, in accordance with requests transmitted by radio signal from the information-processing terminal, and to transmit, by radio signal, data received from the external network and the compression-encoded broadcast program data to the information-processing terminal in a time-divided fashion when the communications control device receives the compression-encoded broadcast program data provided in the apparatus.

5 Claims, 7 Drawing Sheets

FOREIGN PATENT DOCUMENTS

| | | |
|---|---|---|
| JP | 2000-41198 | 2/2000 |
| JP | 2001-148816 | 5/2001 |
| JP | 2001-358966 | 12/2001 |
| WO | 01/56297 A1 | 8/2001 |
| WO | WO 01/56297 * | 8/2001 |

OTHER PUBLICATIONS

VAIO Desktop Series, General Catalogue, Sony Corporation, (Dated Nov. 2001).

Outline of Hitachi, News Release (Dated Dec. 20, 2001).

Office Action: Notice of Reasons for Rejection for Patent Application No. 2005-282594 (Dated Oct. 5, 2007).

Treasure Box of Regulations IEEE802.11e, Column/Trend Watch Network Magazine, Feb. (2001) issue, Feb. 17, 2001, 4 pgs.

Japanese Patent Office: Decision of Patent Grant (Division) for Patent Application No. 2005-282594 dd Apr. 8, 2008, 7 pgs.

Takanori Serizawa: Expectation and Anxiety for Home Server—World PC Expo 2001 report, +D Life Style, (dated: Sep. 19, 2001; search date Jan. 10, 2008: URL: http://plusd.itmedia.co.jp/broadband/0109/19/homeserver.html).

Japanese Patent Office: Notice of Reasons for Rejection for Patent Application No. 2005-282594 (dated: Jan. 11, 2008; 5 pgs.).

* cited by examiner

WIRELESS DATA-TRANSFERRING APPARATUS

CROSS-REFERENCE TO RELATED APPLICATIONS

This application is based upon and claims the benefit of priority from prior Japanese Patent Application No. 2002-020560, filed Jan. 29, 2002.

BACKGROUND OF THE INVENTION

1. Field of the Invention

The present invention relates to a wireless data-transferring apparatus that performs wireless communication with information-processing terminals such as personal computers and personal digital assistants (PDAs).

2. Description of the Related Art

In recent years, information-processing technology and the network technology have advanced. Thanks to the technology advance, home networks have been developed to achieve communication between electronic apparatuses, such as household TVs, audio apparatuses, and the like.

Japanese Patent Application KOKAI Publication No. 2001-358966 discloses a TV reception system. In the TV reception system, a TV program received at the station-selecting apparatus is transmitted by radio to a dedicated display unit, which displays the TV program. The TV reception system can be connected to the Internet. The station-selecting apparatus includes a station-selecting unit for receiving the TV program, a wireless communication unit for communicating with the dedicated display unit, and a modem unit being connected to the Internet. A CPU provided in the station-selecting apparatus controls all these units.

However, the station-selecting apparatus cannot be connected to the Internet while a TV program is being transmitted to the display, and a TV program cannot be transmitted to the display while the system remains connected to the Internet. Inevitably, the display displays only a Web page or the TV program at a time.

Recently, broadband communication lines have come into use to connect electronic apparatuses to the Internet. Thus, more and more electronic apparatuses is are kept connected to the Internet by the broadband communication lines. It is therefore demanded that a new system be provided which enables people to browse Web pages on the Internet while enjoying a TV program.

Furthermore, it will soon become important to display TV programs on the display monitors of information-processing terminals such as PDAs and notebook-type personal computers. A system that transmits TV programs by radio signal to the information-processing terminals, and displays TV programs on the display monitors of the terminals, not on the dedicated display unit, is desirable. Most information-processing terminals used today operate on the Windows system. Hence, TV programs must be displayed on the display monitors of these terminals in the same way as application programs, at any position desired and in any size desired.

BRIEF SUMMARY OF THE INVENTION

An object of the present invention is to provide a wireless data-transferring apparatus that can transfer both broadcast program data such as TV programs and Internet content such as Web pages to information-processing terminals at the same time.

According to an embodiment of the present invention, there is provided a wireless data-transferring apparatus for performing wireless communication with an information-processing terminal, comprising: means for receiving broadcast program data; and a communications control device configured to perform data-transfer between an external network and the information-processing terminal, in accordance with requests transmitted by radio signal from the information-processing terminal, and to transmit, by radio signal, data received from the external network and the broadcast program data to the information-processing terminal in a time-divided fashion when the communications control device receives the broadcast program data provided in the apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given below and the detailed description of the embodiments given below, serve to explain the principles of the invention.

DETAILED DESCRIPTION

An embodiment of the present invention will be described, with reference to the accompanying drawings.

Figure 1:
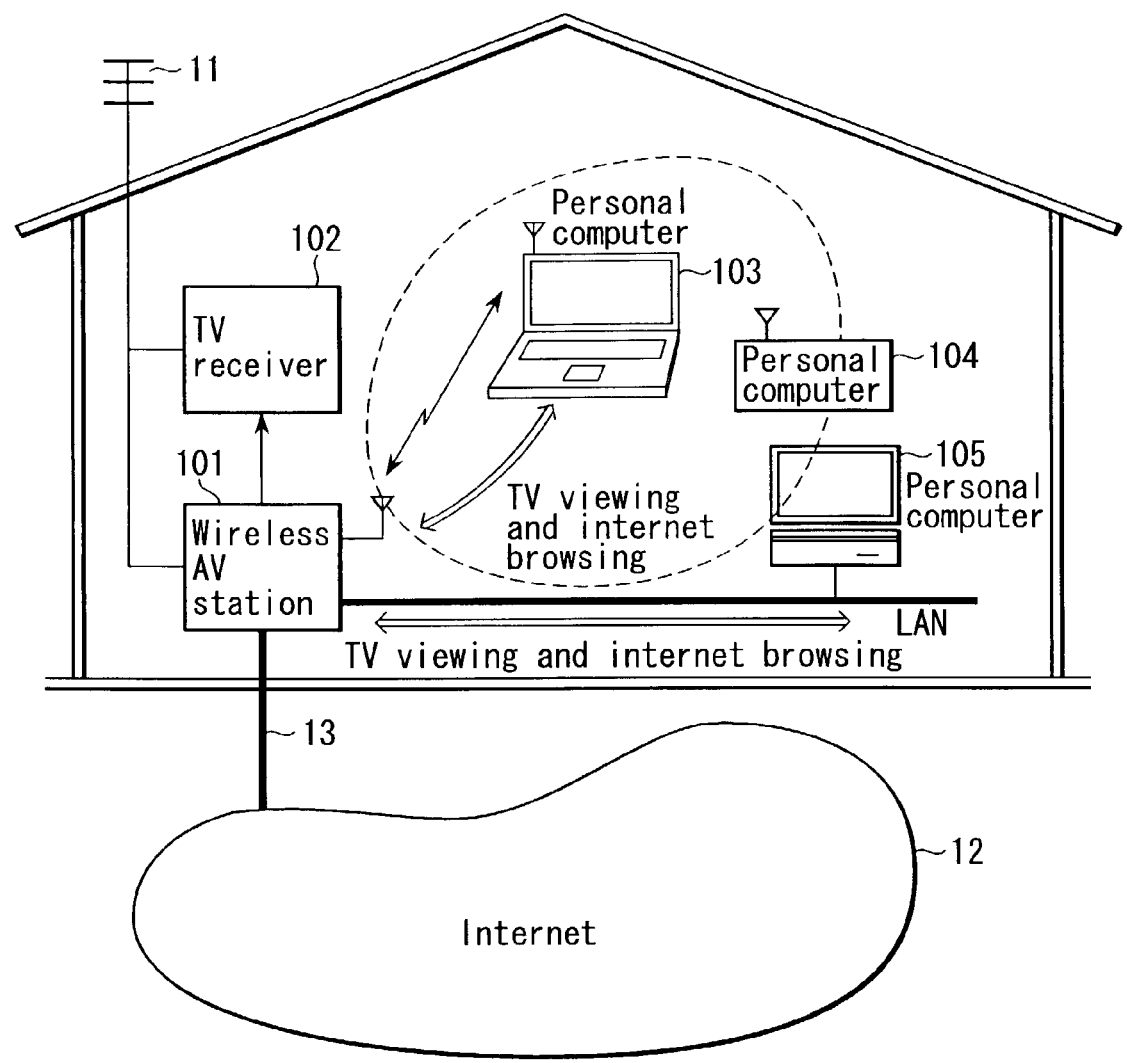
FIG. 1 is a diagram showing a home network system that incorporates a wireless data-transferring apparatus that is an embodiment of this invention.

FIG. 1 shows a home network system provided in a house and incorporating a wireless data-transferring apparatus that is an embodiment of the present invention.

The home network system includes a wireless AV (Audio Video) station 101, a TV receiver 102, notebook-type portable personal computers 103 and 104, and a desktop-type personal computer 105. The wireless AV station 101 is a wireless data-transferring apparatus that functions as home network server. The station 101 can transfer, by radio signal, both broadcast content such as TV programs and Internet content such as Web pages to the portable personal computers 103, 104.

The wireless AV station 101 is connected to an external global network (external network) such as the Internet 12 by a communications line 13. The communications line 13 may be, for example, an ISDN (Integrated Services Digital Network), an ADSL (Asymmetric Digital Subscriber Line), or a CATV (Cable TV) line. The wireless AV station 101 is connected to the information-processing terminals (including the computers 103 to 105), by a wired or wireless network that is provided in the home network system.

The notebook-type portable personal computers 103 and 104 include a wireless communications device. They may be therefore connected, by radio, to the wireless AV station 101. The desktop-type personal computer 105 is connected to the wireless AV station 101 by a wired LAN (Local Area Network).

The wireless AV station 101 connects the personal computers 103 to 105 to the Internet 12. The station 101 accomplishes data communication between the Web sites on the Internet 12 and the personal computers 103 to 105.

A TV antenna 11 is provided outside the house. The antenna cable extends from the TV antenna 11 into the house. In the house, the antenna cable is connected to the wireless AV station 101 and the TV receiver 102. The TV receiver 102 and the wireless AV station 101 may therefore receive and play back the TV broadcast program data broadcast from a TV broadcast station. The wireless AV station 101 receives a broadcast program data and sends the data, by the wireless LAN, to the notebook-type portable personal computers 103 and 104. It sends the broadcast program data, by the wired LAN, to the desktop-type personal computer 105, too.

The wireless AV station 101 performs various functions, including a wireless router function, a TV function, a TV record function, and a remote-control function. These functions will be described below.

Wireless Router Function

This function is to connect each of the portable personal computers 103 and 104 to the Internet 12 via the wireless LAN to achieve data communication between any Web site on the Internet 12 and each of the portable personal computers 103 and 104. Any person in the house may operate the notebook-type portable personal computer 103 or 104 to browse Web pages on the Internet 12 at any place in the house, where the portable personal computer resides. This is because the portable personal computer 103 and 104 may be connected by radio to the wireless AV station 101 that is connected to the Internet 12 by the communication line 13.

TV Function

The TV function is to transmit any TV broadcast program data received at the wireless AV station 101 to the information-processing terminals via the wired LAN or the wireless LAN. The user can enjoy the TV programs being broadcast at present, at any place in the house, only if he or she operates the notebook-type portable personal computer 103 or 104.

TV Record Function

The wireless AV station 101 incorporates a magnetic disk drive (e.g., hard-disk drive; HDD) that serves as a large-capacity storage device for recording broadcast program data. The station 101 can record the broadcast program data being broadcast at present, while transmitting this program data to the information-processing terminals. Moreover, the station 101 may receive the broadcast program data being broadcast at present and record the same in the magnetic disk drive, while transmitting any broadcast program data stored in the magnetic disk drive to the information-processing apparatuses. Further, the station 101 may output the broadcast program data stored in the disk drive to the TV receiver 102, to display the broadcast program data on the TV screen of the TV receiver 102.

Remote-Control Function

The user can remote-control the TV function and TV record function of the wireless AV station 101 by operating the personal computer 103, 104 or 105. Alternatively, the user may operate a remote-control unit designed to operate the station 101, thereby to remote control the TV function and TV record function of the station 101.

The wireless AV station 101 will be described, with reference to FIG. 2.

Figure 2:
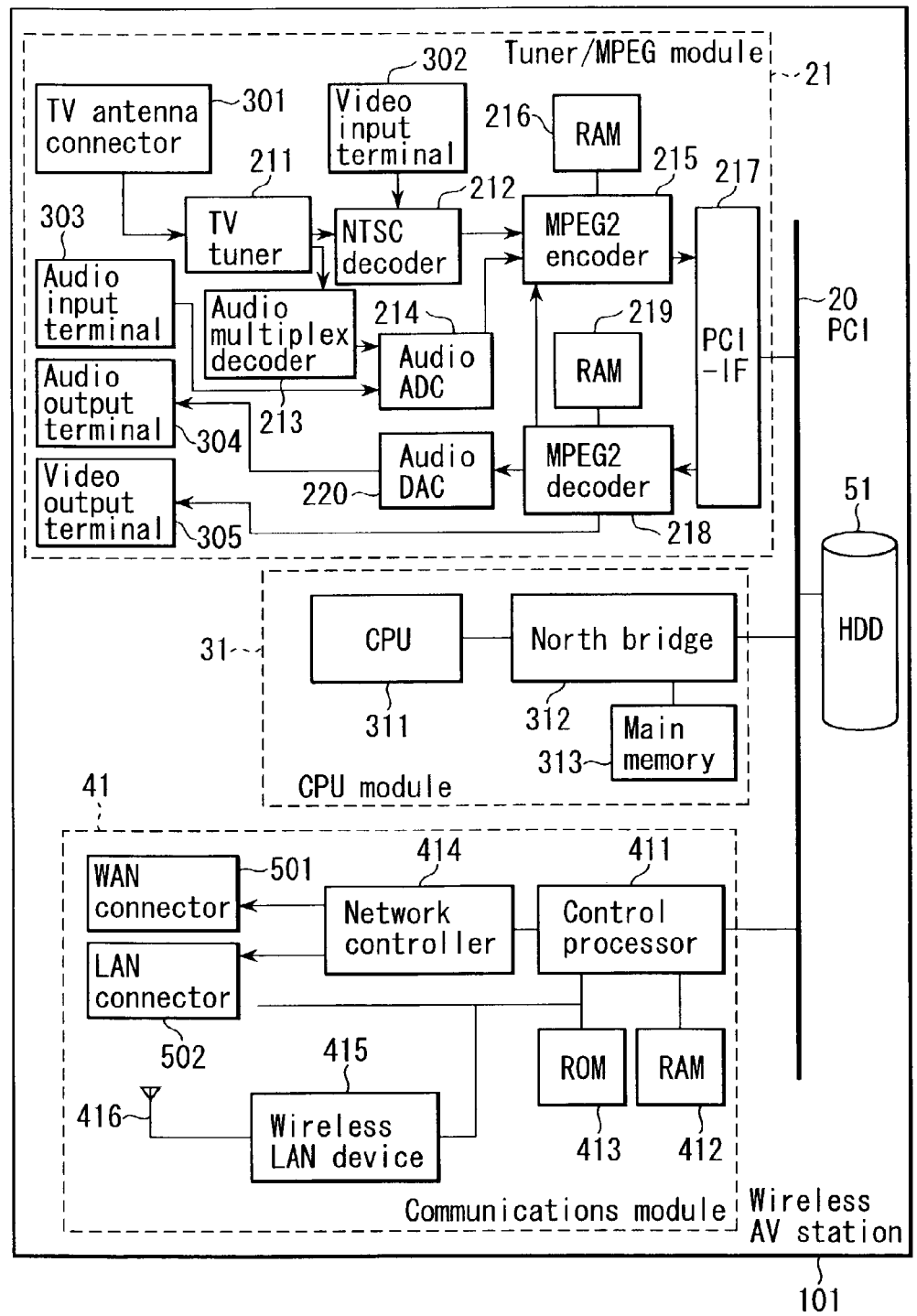
FIG. 2 is a block diagram of the wireless data-transferring apparatus.

As FIG. 2 depicts, the wireless AV station 101 includes three major components, i.e., a tuner/MPEG module 21, a CPU module 31, and a communications module 41.

The tuner/MPEG module 21, CPU module 31 and communications module 41 are connected to a bus 20, which may be a PCI bus. A hard disk drive (HDD) 51 is connected to the PCI bus 20, too.

The tuner/MPEG module 21 receives TV broadcast program data, performs compression-encoding to compress the broadcast program data, and decodes the compressed program data, thus reproducing the TV program data. As FIG. 2 shows, the tuner/MPEG module 21 includes a TV tuner 211, an NTSC (National TV Standards Committee) decoder 212, an audio multiplex decoder 213, an audio A/D converter (audio ADC) 214, an MPEG2 encoder 215, a RAM 216, a PCI bus interface (PCI-IF) 217, an MPEG2 decoder 218, a RAM 219, and an audio D/A converter (audio DAC) 220.

A TV antenna connector 301 connects the TV tuner 211 to the TV antenna cable. The TV tuner 211 is a device that receives the TV broadcast program data on the channel that the user has selected by operating the personal computer 103, 104 or 105 or the remote-control unit. The broadcast program data on the channel selected, received by the TV tuner 211, is sent to the NTSC decoder 212. The NTSC decoder 212 extracts a video signal (moving-image signal) and an audio signal from the broadcast program data. If necessary, the NTSC decoder 212 converts these signals to digital data items.

The NTSC decoder 212 is connected to a video input terminal 302. The NTSC decoder 212 can therefore receive video signals from an external video device such as a DVD (Digital Versatile Disc) player or a VCR (Video Cassette Recorder). The audio multiplex decoder 213 decodes the audio multiplex signal superposed on the broadcast program data. The signal thus decoded is supplied to the audio A/D converter (audio ADC) 214. The A/D converter 214 converts the signal to audio digital data. The A/D converter 214 is connected to an audio input terminal 303. Hence, the A/D converter 214 can receive audio signals from an external audio device.

The MPEG2 encoder 215 receives the video data from the NTSC decoder 212 and the audio digital data from the audio A/D converter 214. It encodes the video data and the audio data, compressing them, in accordance with the MPEG2 standards. The RAM 216 is used as a working memory that assists the MPEG2 encoder 215 to encode the input data items. The broadcast program data is converted to an MPEG2 data stream by the MPEG2 encoder 215.

The PCI bus interface (PCI-IF) 217 is an interface that connects the tuner/MPEG module 21 to the PCI bus 20. The interface 217 therefore enables the tuner/MPEG module 21 to communicate with the CPU module 31 and HDD 51 through the PCI bus 20. The PCI bus interface 217 incorporates registers that the CPU module 31 can access. The registers hold commands supplied by CPU module 31. The TV tuner 211 and the MPEG2 encoder 215 are controlled by the commands held in the registers.

The MPEG2 decoder 218 decodes the broadcast program data encoded in the MPEG2 format. To playback, for example, broadcast program data recorded in the HDD 51, by means of the TV receiver 102, the data is first read from the HDD 51 and supplied via the PCI bus interface 217 to the MPEG2 decoder 218. The MPEG2 decoder 218 decodes (expands) the broadcast program data. The RAM 219 functions as a working memory that assists the MPEG2 decoder 218 to decode the broadcast program data. The MPEG2 decoder 218 operates under the control of the commands held in the registers provided in the PCI bus interface 217.

The video data decoded by the MPEG2 decoder 218 is supplied to the TV receiver 102 via a video output terminal 305. The audio data decoded by the MPEG2 decoder 218 is converted, if necessary, to analog signal, by the audio D/A converter (audio DAC) 220, and supplied from an audio output terminal 304 to the external audio/video device.

The broadcast program data decoded by the MPEG2 decoder 218 may be input to the MPEG2 encoder 215 and encoded therein. This process is performed in preparation for a down-conversion that changes the transfer rate (bit rate) of the encoded broadcast program data recorded in the HDD 51, to a transfer rate dedicated to wireless transmission.

Note that the transfer rate of the broadcast program data encoded by the MPEG2 encoder 215 depends on the desired image quality of the broadcast program data that is to be recorded in the HDD 51. If the desired image quality is high, the stream (MPEG2 stream) of the encoded broadcast program data having a very high transfer rate will be recorded in the HDD 51. Such an MPEG2 stream may not be transmitted in real time in the communication band of the wireless LAN.

In this case, the down-conversion is automatically carried out to lower the transfer rate of the MPEG2 stream to the transfer rate dedicated to wireless transmission via the wireless LAN.

The CPU module 31 controls the TV tuner 211, MPEG2 encoder 215 and MPEG2 decoder 218 of the tuner/MPEG module 21. The CPU module 31 also controls the writing and reading of data into and from the HDD 51. The CPU module 31 communicates with the communications module 41. Thus, it can receive commands concerning the playback or the recording of the broadcast program, from the personal computers 103 to 105, and can transfer the MPEG2 stream to the communications module 41 via PCI bus 20. (The MPEG2 stream is the broadcast program data that should be supplied to the computers 103 to 105.) The CPU module 31 includes a CPU 311, a North bridge 312, and a main memory 313. The North bridge 312 connects the CPU bus of the CPU 311 to the PCI bus 20.

The communications module 41 is a communication control device that may operate as a wireless LAN router by itself. The communications module 41 may be connected, by radio, to the personal computers 103 and 104, and connected to the personal computer 105 via the wired LAN. The communications module 41 may connect the personal computers 103 to 105 to the Internet 12, in accordance with access commands transmitted from the personal computers 103 to 105. The communications module 41 may thus achieve data-transfer between the Internet 12 and the personal computers 103 to 105. The module 41 performs all process of transferring data between the Internet 12 and each of the computers 103 to 105. The CPU module 31 is not used at all to transfer data between the Internet 12 and any personal computer.

As FIG. 2 shows, the communications module 41 includes a control processor 411, a RAM 412, a ROM 413, a network controller 414, a wireless LAN device 415, a WAN connector 501, and a LAN connector 502.

The WAN (Wide Area Network) connector 501 is a terminal for being connected to a global network, and is used to transfer data between the communications module 41 and the Internet 12. The connector 501 is connected to the communication line 13 via, for example, a modem. The LAN connector 502 is connected to the wired LAN provided in the house.

The network controller 414 is a network control device that controls the transfer of data between the communications module 41 and the Internet 12 through the WAN connector 501, and the transfer of data between the module 41 and the household wired LAN through the LAN connector 502.

The wireless LAN device 415 is a wireless communications device that accomplishes the transfer of data between the module 41 and each of the personal computers 103 and 104, through the wireless LAN. That is, the wireless LAN device 415 achieves the transfer of data via an antenna 416. The device 415 may be one that conforms to the IEEE 802.11b standard, the IEEE 802.11a standard, or the like.

The control processor 411 controls the network controller 414 and the wireless LAN device 415 to control the transfer of data between the Internet 12 and each of the personal computers 103 and 104. To be more specific, the control processor 411 performs IP masquerade function, NAT (Network Address Translation) function, DHCP (Dynamic Host Configuration Protocol) function, and the like.

The control processor 411 is connected to the PCI bus 20. Thus, the processor 411 can send commands to the CPU 311 through the PCI bus 20, the commands are concerning the viewing of the broadcast programs and received from the personal computers 103 and 104 via the wireless device 415. Further, the processor 411 may supply commands received from the personal computer 105 and concerning the viewing of the broadcast programs, to the CPU 311 through the PCI bus 20.

The control processor 411 transmits a broadcast program data to the personal computer that has demanded the broadcast program data, through the wireless LAN device 415 or the network controller 414, when it receives the broadcast program data from the CPU 311 via PCI bus 20. The transmitting of the broadcast program data to the personal computer is performed in parallel with the data-transfer between the personal computer and the Internet 12.

Assume that a person is browsing Web pages on the Internet 12 by using of the personal computer 103 that may be connected by radio to the communications module 41. To transmit the broadcast program data that has been demanded from the personal computer 103, to the personal computer 103, the control processor 411 controls the wireless LAN device 415 so that the Web content data received from a Web server on the Internet 12 and the broadcast program data encoded by the tuner/MPEG module 21 may be transmitted to the personal computer 103 in a time-divided fashion. More specifically, the control processor 411 multiplexes the Web content data and the broadcast program data encoded, generating time-division multiplex data. The time-division multiplex data is transmitted by radio to the personal computer 103. Namely, the Web content data and the broadcast program data are transmitted to the computer 103 as data items independent of each other. Therefore, the personal computer 103 can simultaneously display the Web content data and the broadcast program data, by use of two application programs for displaying them. The window of the Web content data may be freely changed in position and size by the application program for displaying the Web content. So may be changed the window of the broadcast program by the application program for displaying the broadcast program.

The function of the control processor 411, described above, is implemented by the firmware that is stored in the ROM 413.

It will be explained how the Web content data and the TV broadcast program data are transferred within the wireless AV station 101 (i.e., wireless data-transferring apparatus), with reference to FIG. 3.

Figure 3:
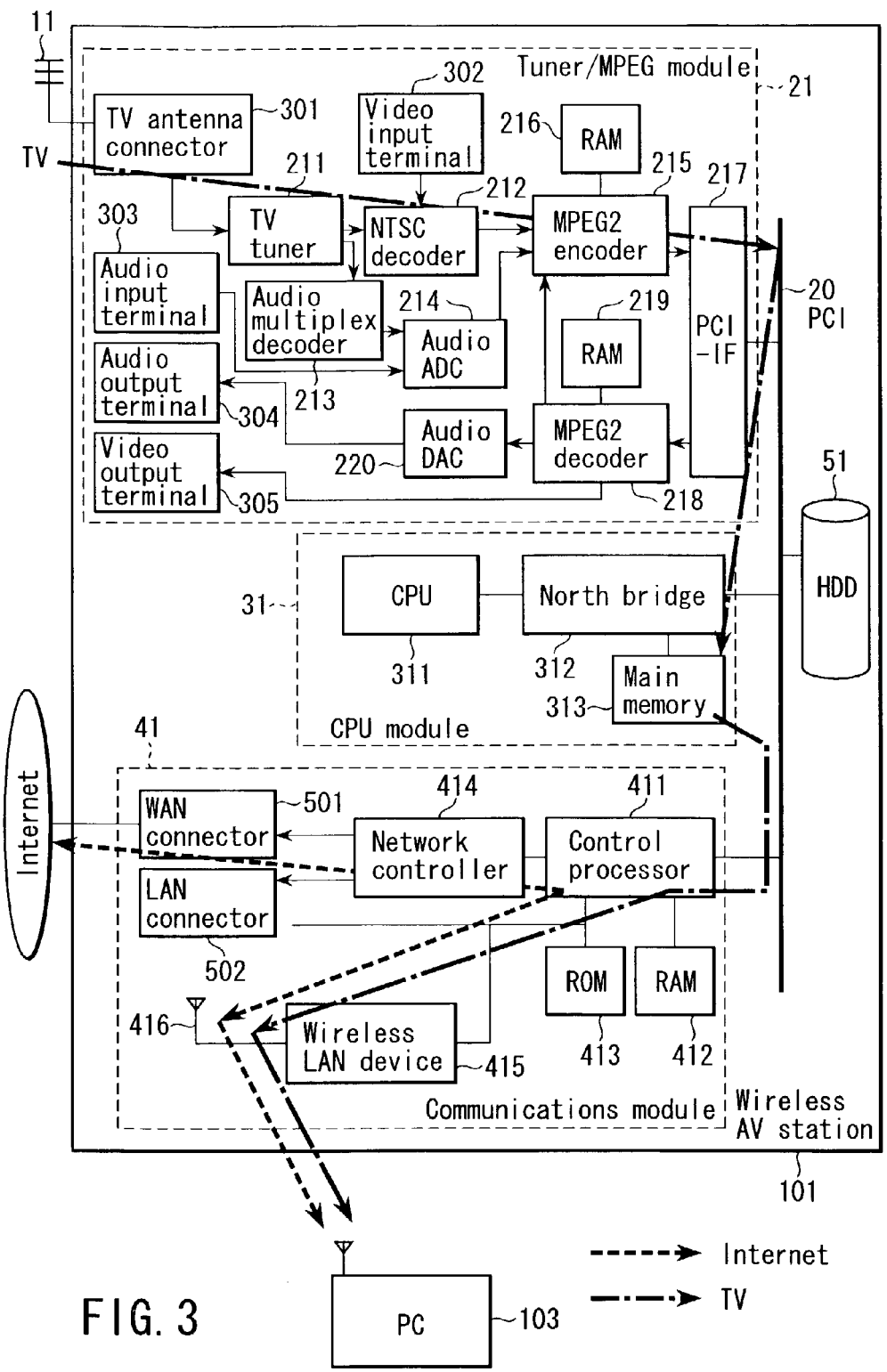
FIG. 3 is a diagram explaining how Web content data and broadcast program data flow in the wireless data-transferring apparatus.

FIG. 3 shows how these data items are transferred from the wireless AV station 101 to the personal computer 103.

The personal computer 103 may generate an access command for the connection of the computer 103 to the Internet 12. The wireless LAN device 415 receives this command through the wireless LAN. The command is transferred to the control processor 411. The control processor 411 determines that the command is one for the connection of the computer 103 to the Internet 12. The processor 411 controls the network controller 414 and the wireless LAN device 415, connecting the personal computer 103 to a Web server included in the Internet 12. Thus, the transfer of data between the personal computer 103 and the Web server is started.

The data that the Web server should receive is transmitted from the personal computer 103 to the Internet 12 via the wireless LAN device 415, control processor 411, network controller 414, and WAN connector 501. On the other hand, the Web content data is transmitted from the Web server on the Internet 12 to the wireless AV station 101. In the wireless AV station 101, the content data goes through the WAN connector 501, network controller 414, control processor 411, and wireless LAN device 415, and is transmitted by radio from the wireless LAN device 415 to the personal computer 103.

Thus, the transfer of data between the personal computer 103 and the Internet 12 is carried out by the components of the communications module 41. Therefore, the Web content data received from the Internet 12 is not transferred on the PCI bus 20.

When the personal computer 103 issues a command for viewing of a TV broadcast program data, the command is transmitted to the wireless LAN device 415. The wireless LAN device 415 supplies this command to the control processor 411. The control processor 411 determines that the command requests for viewing of the broadcast program data. The processor 411 then supplies the command to the CPU 311 through the PCI bus 20. The CPU 311 sets the command into the PCI interface 217. Note that the command contains various parameters such as the TV channel number, transfer rate (bit rate of the MPEG2 stream), and the like. Once the command is set in the PCI interface 217, the TV tuner 211 starts receiving the broadcast program data. The broadcast program data thus received is supplied to the MPEG2 encoder 215. The encoder 215 encodes the broadcast program data at the transfer rate that is contained in the command.

The broadcast program data, now encoded, is transferred via the PCI bus 20 to the main memory 313. The data is then transferred from the main memory 313 to the control processor 411 of the communications module 41 through the PCI bus 20. Thus, the broadcast program data encoded by the MPEG2 encoder 215 is continuously transferred to the communications module 41.

Figure 5:
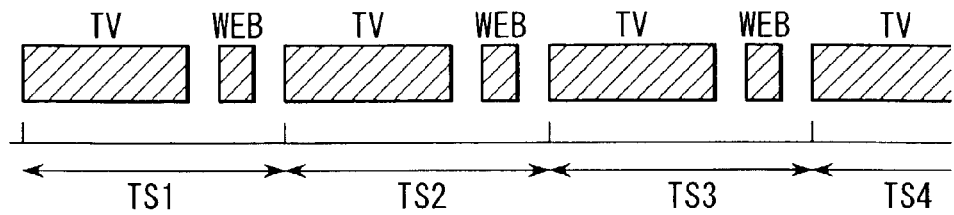
FIG. 5 is a diagram showing how the wireless data-transferring apparatus transfers the broadcast program data prior to the Web content data.

The control processor 411 transfers the encoded broadcast program data to the wireless LAN device 415 so that the data may be transmitted to the personal computer 103. If the personal computer 103 is communicating with a Web server on the Internet 12, the control processor 411 sends the encoded broadcast program data and the Web content data received from the Web server to the wireless LAN device 415 in a time-divided fashion. The wireless LAN device 415 transmits the broadcast program data and the Web content data to the personal computer 103 in a time-divided fashion. In this case, the control processor 411 sends the broadcast program data in preference to the Web content data, in order to transmit the broadcast program data to the personal computer 103 in real time. That is, in the data communication between the personal computer 103 and the wireless LAN device 415 via the wireless LAN, a bandwidth (time period), necessary to transmit the broadcast program data in real time, is reserved in each time slot (TS), as is illustrated in FIG. 5. The broadcast program data is transmitted to the computer 103 during a time period (TV) reserved in each time slot TS, the Web content data is transmitted to the computer 103 during the remaining period (Web) of the each of time slot TS.

Real-time transfer protocol (RTP), for example, is employed to transmit the broadcast program data. More precisely, the control processor 411 adds a time stamp to each packet of the broadcast program data. The packets, each with a time stamp, are sent to the wireless LAN device 415 as data to be transmitted to the personal computer 103.

Figure 4:
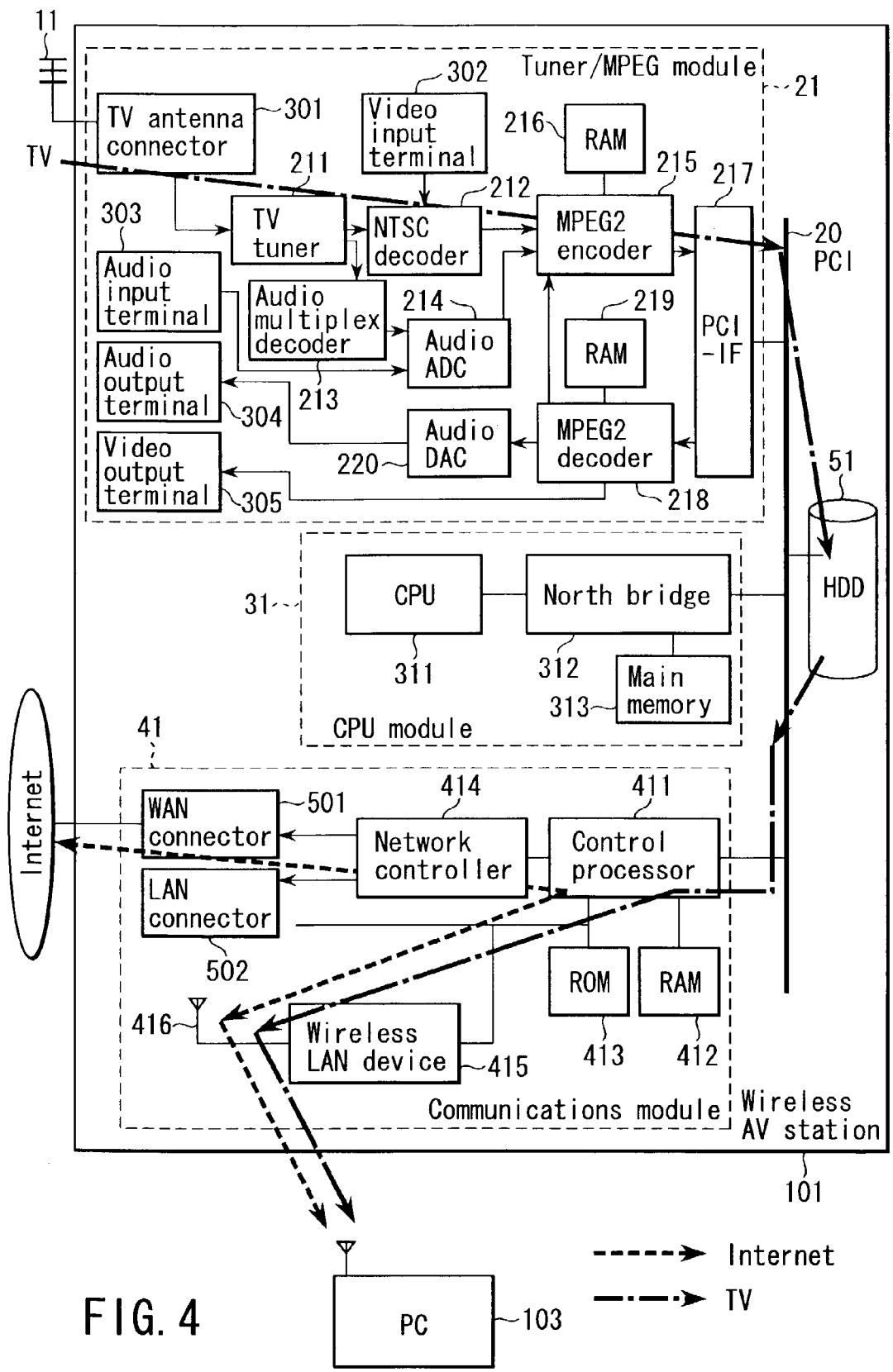
FIG. 4 is a diagram illustrating how Web content data and broadcast program data flow in another manner in the wireless data-transferring apparatus.

FIG. 4 depicts how broadcast program data recorded in HDD 51 is transmitted to the personal computer 103.

While a broadcast program is being recorded in the HDD 51, another broadcast program may be read from the HDD 51 and sent by radio to the personal computer 103. Further, when a broadcast program is being recorded in the HDD 51, the broadcast program may be read from the HDD 51 and transmitted to the personal computer 103, starting at the very time the first part or any other part of the broadcast program has been recorded in the HDD 51.

Assume that the personal computer 103 issues a command for viewing of a broadcast program already recorded in the HDD 51. Then, the CPU 311 determines the transfer rate of the broadcast program recorded in the HDD 51. If the transfer rate exceeds a prescribed rate at which the data can be sent by radio in real time, down-conversion is automatically performed, lowering the transfer rate for the broadcast program data. Thereafter, the broadcast program data is transferred to the communications module 41 via the PCI bus 20. If the transfer rate is equal to or lower than the prescribed rate, the broadcast program data is read from the HDD 51 and transferred to the communications module 41. The down-conversion is not performed.

Figure 6:
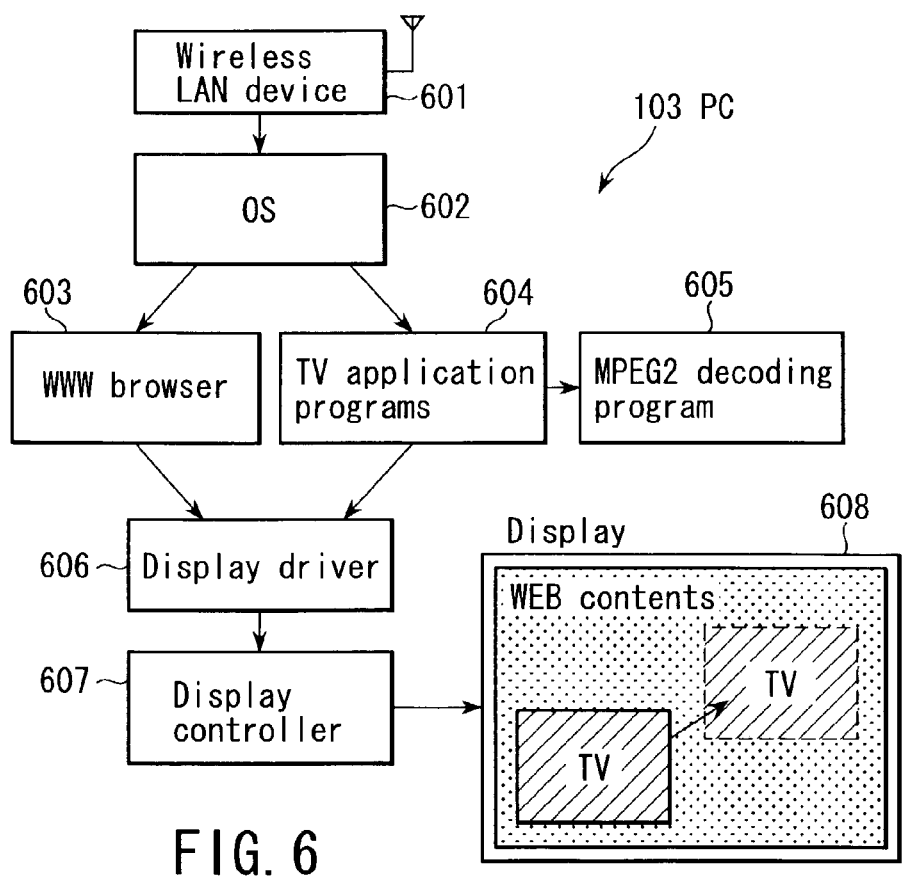
FIG. 6 is a diagram explaining how an information-processing terminal simultaneously displays broadcast program data and Web content data, both transmitted from the wireless data-transferring apparatus.

How the personal computer 103 simultaneously displays broadcast program data and the Web content data, both transmitted by radio, from the wireless AV station 101, with reference to FIG. 6.

As FIG. 6 shows, the personal computer 103 includes a wireless LAN device 601, an operating system (OS) 602, an MPEG2 decoding software 605, a display driver 606, a display controller 607, and a display 608. A WWW (World Wide Web) browser 603, a TV application program 604 and MPEG2 decoding software 605 are installed in the personal computer 103.

In the personal computer 103, the wireless LAN device 601 transfers any data it has received, to the operating system (OS) 602. The OS 602 determines the type of the data from the session ID information added to the data, such as the port number. The data is then transferred to the application program dedicated to this type of data. The Web content data transmitted from a WWW server in the Internet 12 is transferred to the WWW browser 603 that has requested it. The broadcast program data is transferred to the TV application program 604 that has requested it. The TV application program 604 decodes the broadcast program data, in cooperation with the MPEG2 decoding software 605.

Windows are assigned to the WWW browser 603 and TV application programs, respectively. The Web content data transmitted from the WWW server is supplied to the display 608 through the display driver 606 and display controller 607. The display 608 displays the content data in one of the windows on the display 608, which corresponds to the WWW browser 603. The broadcast program data is supplied to the display 608 via the display driver 606 and display controller 607, too. The display 608 displays the broadcast program data in the window that corresponds to the TV application programs 604.

As described above, each window may be freely changed in position and size by the application program that corresponds to it. As FIG. 6 depicts, the window for the WWW browser 603 is a full-size screen, whereas the window for the TV application program 604 is a small screen. The position of the window for the TV application program 604 may be changed, merely by dragging the mouse device of the personal computer 103. Further, the window for the TV application program 604 may be changed to a full-size screen, if desired or necessary.

Figure 7:
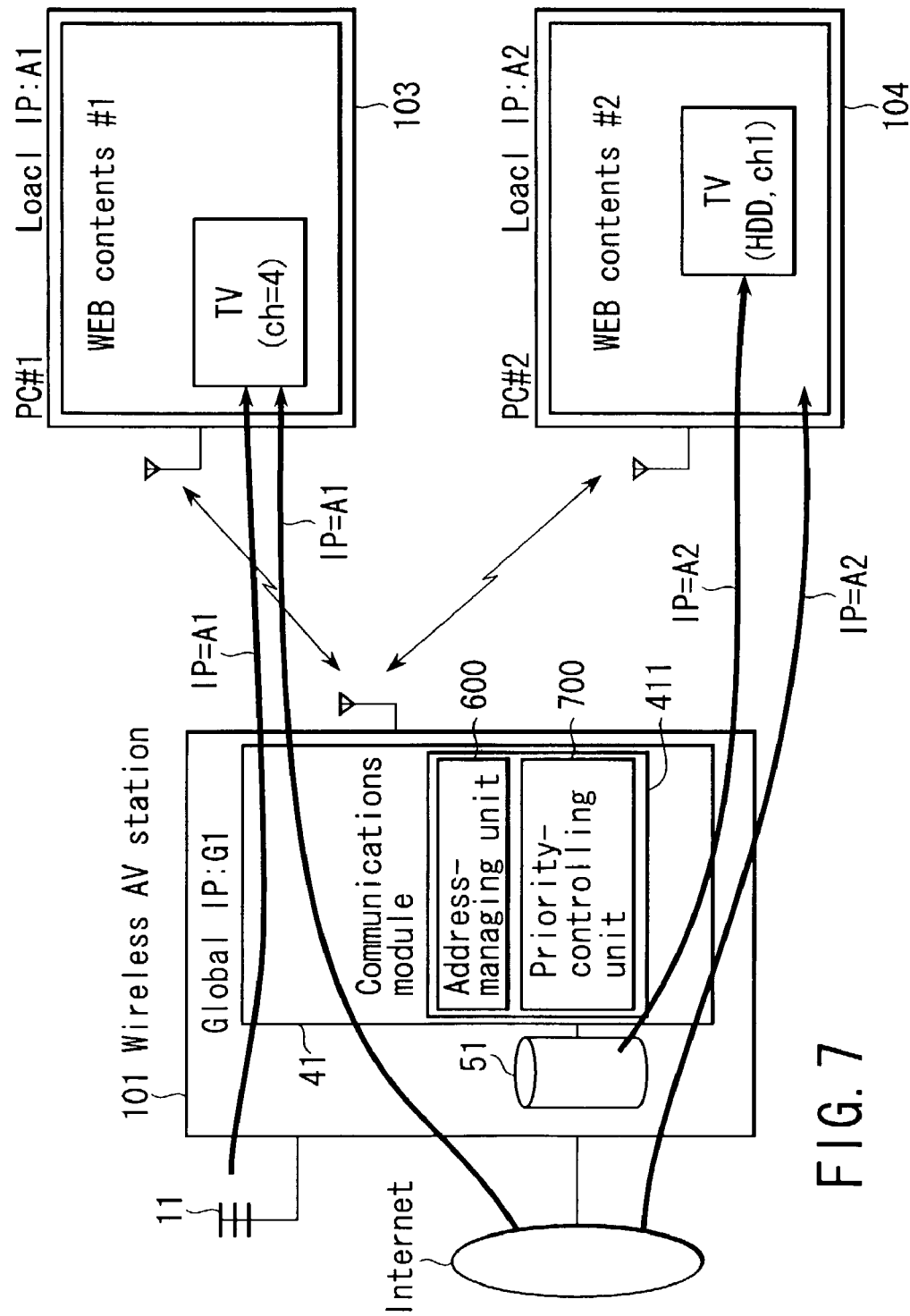
FIG. 7 is a diagram illustrating how the wireless data-transferring apparatus transmits broadcast program data to two information-processing terminals at the same time.

FIG. 7 illustrates how each of the personal computers 103 and 104 displays a broadcast program and Web page.

Assume that the personal computer (PC#1) 103 displays a TV program (e.g., program on channel 4, ch=4) being broadcast, while displaying Web content #1. Also assume that the personal computer (PC#2) 104 displays a TV program (e.g., program on channel 1, ch=1) already recorded in the HDD 51, while displaying Web content #2.

As seen from FIG. 7, the control processor 411 includes an address-managing unit 600 and a priority-controlling unit 700. The address-managing unit 600 determines which personal computer has requested which broadcast program data. The unit 600 associates the local IP address of any personal computer with the broadcast program data requested by the personal computer. When the unit 600 receives broadcast program data from the CPU 311, it transmits the data to the personal computer having the local IP address associated with the data.

The priority-controlling unit 700 controls the data transmission to each of the personal computers 103 and 104. More specifically, it operates to transmit the broadcast program data to a personal computer prior to Web content data.

To make the personal computers 103 and 104 access the Internet 12, their local IP addresses are switched to the global IP addresses assigned to the communications module 41, respectively. The data communication between any Web server on the Internet 12 and the communications module 41 of the wireless AV station 101 is carried out by using the global IP address allocated to the communications module 41. The data communication between the communications module 41 and the personal computers 103 and 104 is effected by using the local IP addresses of the personal computers 103 and 104.

Figure 8:
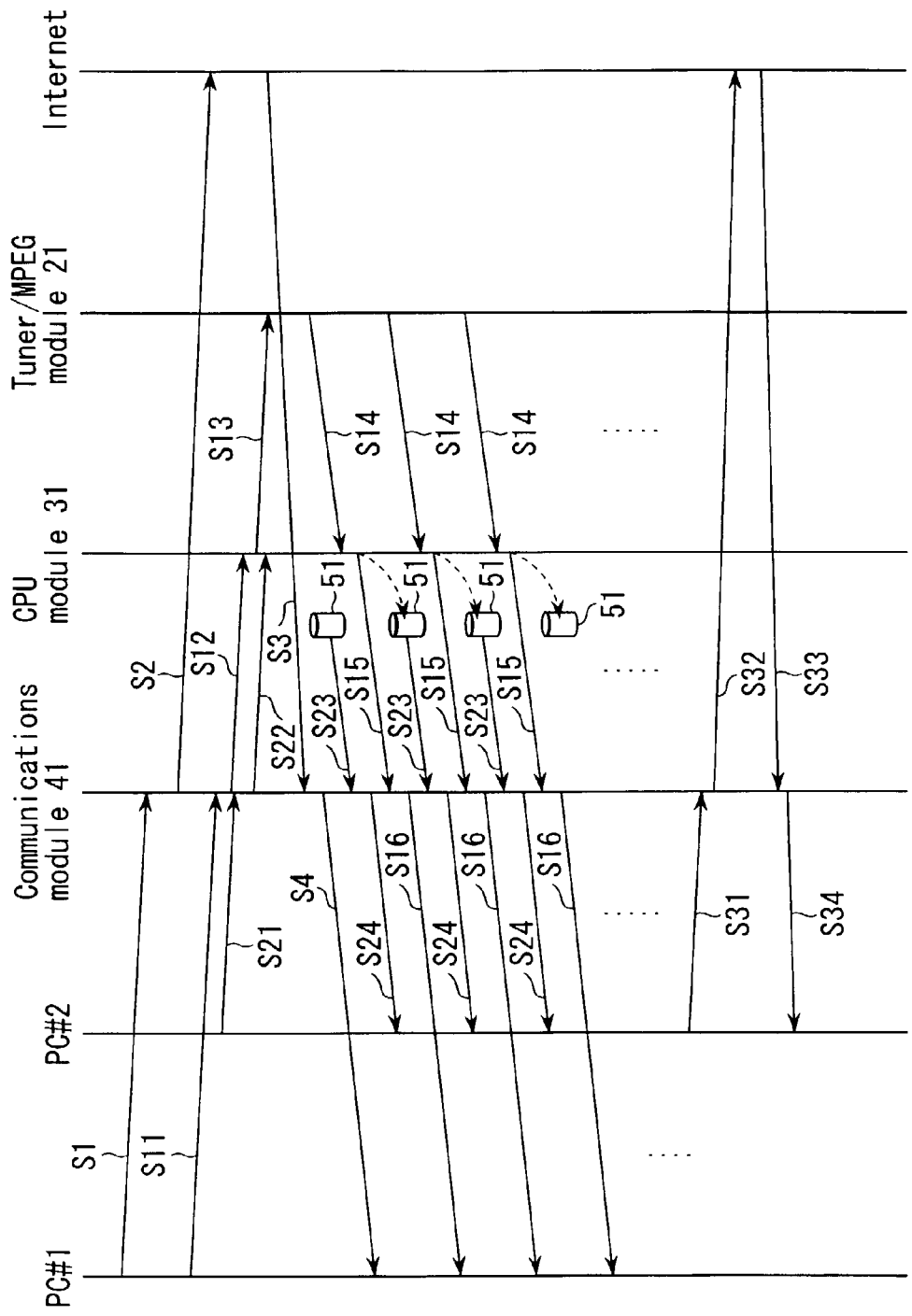
FIG. 8 is a diagram explaining a sequence of steps that the wireless data-transferring apparatus performs to enable the user to enjoy broadcast programs and Web content, by using an information-processing terminal.

A sequence of steps an information-processing apparatus performs to enable the user to read Web pages via the Internet 12 and enjoy TV broadcast programs, by using the wireless AV station 101, will be explained with reference to FIG. 8.

<Browsing Web pages at PC#1>

A command for connecting the personal computer (PC#1) 103 to the Internet 12 (e.g., a command for accessing an Internet service provider or a WWW server) is transmitted to the communications module 41 through the wireless LAN (Step S1). In response to this command, the communications module 41 accesses the Internet 12, connecting the personal computer (PC#1) 103 to the Internet 12 (Step S2). The module 41 receives Web content data from the Internet 12 (Step S3). Next, the module 41 transmits the Web content data to the personal computer (PC#1) 103 via the wireless LAN (Step S4).

<Displaying a TV Program at PC#1>

The personal computer (PC#1) 103 may transmit a command requesting a broadcast program. This command is sent to the communications module 41 via the wireless LAN (Step S11). The communications module 41 transfers the command to the CPU module 31 through the PCI bus 20 (Step S12). The CPU module 31 controls the tuner/MPEG module 21, causing the same to receive, and encode the broadcast program data requested from the personal computer (PC#1) 103 (Step S13). The tuner/MPEG module 21 receives and encodes the broadcast program data. The data encoded is transferred to the CPU module 31 through the PCI bus 20 (Step S14). The CPU module 31 transfers the broadcast program data via the PCI bus 20 to the communications module 41 (Step S15). The user of the personal computer (PC#1) 103 may request not only the displaying of the broadcast program data, but also the recording thereof. If so, the broadcast program data is recorded in the HDD 51. Upon receipt of the broadcast TV program data, the communications module 41 transmits the data to the personal computer (PC#1) 103 via the wireless LAN (Step S16). Steps S14, S15 and S16 are repeatedly performed in order to transmit the broadcast program data, which the wireless AV station 101 is receiving, to the personal computer (PC#1) 103 in real time. In this case, Steps S14, S15 and S16 are carried out at the same time.

<Displaying of the TV Program Stored in HDD, at PC#2>

The personal computer (PC#2) 104 generates a command for requesting a broadcast program. The command is transmitted from the computer (PC#2) 104 to the wireless AV station 101 via the wireless LAN. (Step S21). In the wireless AV station 101, the communications module 41 transfers the command to the CPU module 31 through the PCI bus 20 (Step S22). If the command requests for broadcast program data stored in the HDD 51, the CPU module 31 reads this data from the HDD 51 and transfers it via the PCI bus 20 to the communications module 41 (Step S23). In Step S23, down-conversion is performed, if necessary, to lower the transfer rate of the broadcast program data. That is, the CPU module 31 determines whether the transfer rate is higher than the prescribed rate at which the data can be sent by radio in real time. If the transfer rate is equal to or lower than the prescribed rate, the CPU 31 transfers the broadcast program data read from the HDD 51, to the communications module 41 via the PCI bus 20. If the transfer rate higher than the prescribed rate, the CPU module 31 transfers the data to the MPEG2 decoder 218. The decoder 218 decodes the data. The data decoded is transferred to the MPEG2 encoder 215. The encoder 215 processes the data, generating compressed and encoded broadcast program data. This broadcast program data is transferred to the communications module 41 through the PCI bus 20. As long as the MPEG2 encoder 215 is encoding any other broadcast program data, the aforementioned down conversion cannot be carried out. If this is the case, the communications module 41 transmits an error message to the personal computer (PC#2) 104 under the control of the CPU module 31.

The communications module 41 receives the broadcast program data and transmits it to the personal computer (PC#2) 104 through the wireless LAN (Step S24). Steps S23 and S24 are repeatedly performed to transmit the broadcast program data to the personal computer (PC#2) 104 in real time. Note that Steps S23 and S24 are carried out at the same time.

<Browsing Web Pages at PC#2>

Various commands (e.g., command for the connection of the computer 104 to the Internet 12, command for accessing a WWW server, and the like) are sent from the personal computer (PC#2) 104 to the wireless AV station 101 via the wireless LAN. In the wireless AV station 101, these commands are transferred to the communications module 41 (Step S31). The communications module 41 accesses the Internet 12, connecting the personal computer (PC#2) 104 to the Internet 12 (Step S32). The communications module 41 may receive Web content data from the Internet 12 (Step S33). Then, the module 41 transmits the Web content data to the personal computer (PC#2). 104 via the wireless LAN (Step S34).

As indicated above, in the home network system, the wireless AV station 101 transmits the Web content data received from the Internet 12 and the broadcast program data encoded, in a time-divided fashion, to the personal computer that has requested the data items. Hence, the Web content data and the broadcast program data are transmitted as distinct data items independent of each other. The personal computer may therefore display the Web content data and the broadcast program data at the same time. In addition, the windows in which the Web content data and broadcast program data are displayed, respectively, may be changed in both position and size as is desired. Moreover, only the broadcast program data flows through the PCI bus 20 because the data communication between any personal computer and the Internet 12 travels through the communications module 41 without utilizing the PCI bus 20 path. The Web content data would then not flow through the PCI bus 20. This arrangement prevents an increase in the traffic on the PCI bus 20. The broadcast program data, compressed and encoded, may be transferred to the communication module 41 through the bus 20 at high efficiency.

As specified above, the control processor 411 provided in the communications module 41 receives a command for displaying a broadcast program from a personal computer and supplies it to the CPU module 31. Further, the processor 411 controls the process of transmitting the Web content data and the broadcast program data in a time divided-fashion. Therefore, the CPU module 31 need not work at all for the access to the Internet 12 or the data communication between the wireless AV station 101 and any personal computer. The CPU module 31 needs only to control the tuner/MPEG module 21. Hence, the wireless AV station 101 may perform controls to display broadcast programs on any personal computer even if the CPU module 31 is not a high-performance processor.

In the embodiment described above, personal computers are used to browse Web pages and playback broadcast programs. Nonetheless, PDAs and the like, which can decode compressed and encoded broadcast program data and can perform wireless communication, may be employed to browse Web pages and playback broadcast programs. Moreover, the wireless LAN device 415 that conforms with the IEEE 802.11b standard or the IEEE 802.11a standard may be replaced by, for example, a Bluetooth™ device.

Additional advantages and modifications will readily occur to those skilled in the art. Therefore, the invention in its broader aspects is not limited to the specific details and representative embodiments shown and described herein. Accordingly, various modifications may be made without departing from the sprint or scope of the general inventive concept as defined by the appended claims and their equivalents.

What is claimed is:

1. A wireless data-transferring apparatus for performing wireless communication with an information-processing terminal, comprising:
   a receiving unit configured to receive broadcast program data;
   an encoder configured to compression-encode the broadcast program data received by the receiving unit and to output the compression-encoded broadcast program data to a bus; and
   a communication module connected to a wide area network port and configured to perform as a router for connecting the information-processing terminal to an Internet via the wide area network port and for performing data-transfer between the Internet and the information-processing terminal, wherein the communication module includes (a) a network control device connected to the wide area network port and configured to transmit data from the information-processing terminal to the Internet and to receive Web content data from the Internet, (b) a wireless communications device configured to perform wireless communication with the information-processing terminal via a wireless network and to transmit the Web content data received by the network control device to the information-processing terminal via the wireless network, the Web content data being transferred from the network control device to the wireless communications device and not transferred on the bus, and (c) a control module configured to multiplex the Web content data and the compression-encoded broadcast program data to generate time-division multiplex data and to send the generated time-division multiplex data to the wireless communications device so as to simultaneously transmit the Web content data and the compression-encoded broadcast program data to the information-processing terminal in a time-divided fashion when the compression-encoded broadcast program data from the encoder is received via the bus.

2. An apparatus according to claim 1, including:
   a disk storage device which stores the compression-encoded broadcast program data;
   a down-conversion module configured to down-convert the compression-encoded broadcast program data stored in the storage device, lowering a transfer rate when the transfer of the compression-encoded broadcast program data is higher than a rate at which the data can be sent via the wireless network in real time; and
   means for transferring the compression-encoded broadcast program data that has been down-converted, to the communications device via the bus.

3. An apparatus according to claim 1, wherein the control module is configured to add to the Web content data a first session ID identifying Web browser executed in the information processing terminal and to add to the compression-encoded broadcast program data a second session ID identifying a TV application program that requests the broadcast program data and is executed in the information processing terminal.

4. A wireless data-transferring apparatus configured to be connected by radio to an information-processing terminal, comprising:
- a receiving unit which receives broadcast program data demanded by a command transmitted via a wireless network from the information-processing terminal;
- an encoder configured to compression-encode the broadcast program data received by the receiving unit and to output the compression-encoded broadcast program data to a bus;
- a central processing unit (CPU) which controls the receiving unit and the encoder via the bus; and
- a communication module connected to a wide area network port and configured to perform as a router for connecting the information-processing terminal to an Internet via the wide area network port and for performing data-transfer between the Internet and the information-processing terminal, wherein the communication module includes (a) a network control device connected to the wide area network port and configured to transmit data from the information processing terminal to the Internet and to receive Web content data from the Internet, b) a wireless communications device configured to perform wireless communication with the information-processing terminal via a wireless network and to transmit the Web content data received by the network control device to the information-processing terminal via the wireless network, the Web content data being transferred from the network control device to the wireless communications device and not transferred on the bus, and (c) a control module configured to multiplex the Web content data and the compression-encoded broadcast program data to generate time-division multiplex data and to send the generated time-division multiplex data to the wireless communications device so as to simultaneously transmit the Web content data and the compression-encoded broadcast program data to the information-processing terminal in a time-divided fashion when the compression-encoded broadcast program data from the CPU is received via the bus.

5. An apparatus according to claim 4, wherein the control module is configured to add to the Web content data a first session ID identifying Web browser executed in the information processing terminal and to add to the compression-encoded broadcast program data a second session ID identifying a TV application program that requests that the broadcast program data be executed in the information processing terminal.

* * * * *